July 24, 1928.
W. E. ERNST
1,678,212
AUXILIARY COMBUSTION SPACE IN INTERNAL COMBUSTION ENGINES
Filed Nov. 11, 1924
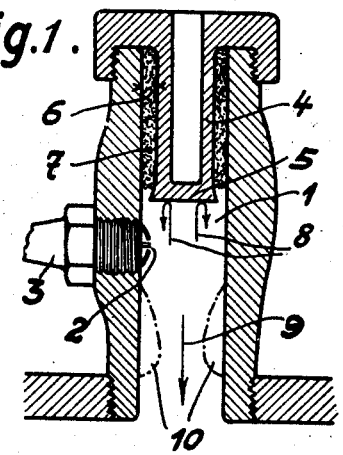
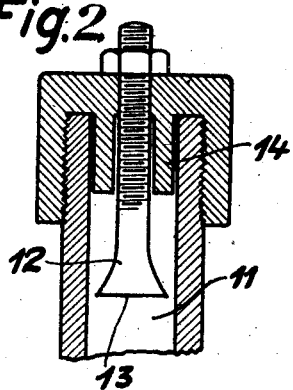
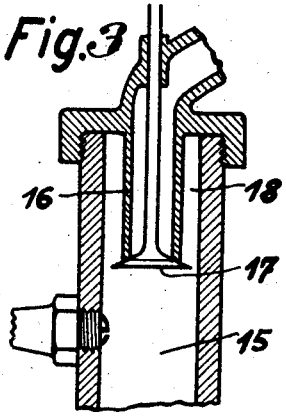
Inventor
W. H. Ernst
By Marks & Clark, Attys.

Patented July 24, 1928.

1,678,212

UNITED STATES PATENT OFFICE.

WILHELM EBERHARD ERNST, OF BERLIN-SCHONEBERG, GERMANY.

AUXILIARY COMBUSTION SPACE IN INTERNAL-COMBUSTION ENGINES.

Application filed November 11, 1924, Serial No. 749,298, and in Germany November 16, 1923.

In internal combustion engines, which comprise an auxiliary combustion space communicating with the main combustion space, this auxiliary combustion space is filled after the working stroke with burnt gases and it is difficult to remove the same at the succeeding suction stroke or scavenging. If an ignition point is arranged in the auxiliary combustion space these burnt gases prevent or impede the ignition.

It has already been proposed to arrange the ignition point in the auxiliary combustion space in such a manner that at the compression stroke the residues of burnt gases in the auxiliary combustion chamber are forced behind the ignition point so that this ignition point is situated in fresh mixture.

It has been found that, at the ignition no strong explosion and pressure waves, propagating themselves far into the main combustion space, are produced in the auxiliary combustion space. The reason herefore is that the burnt gases, compressed behind the ignition point, form a body in which the explosion waves cannot propagate in a favorable manner up to the end wall of the auxiliary combustion space which serves as reflection surface, this being due to the lack of a suitable mixture, so that they are not reflected from this end wall to wander into the main combustion space and to increase the effect resulting from the preceding initial waves.

The burnt gases in the auxiliary combustion chamber act like a spongy structure, which absorbs the explosion waves produced by the ignition.

According to the invention these inconveniences are avoided by keeping in the auxiliary combustion space a reflecting surface free from burnt gases so that it is capable to exert its effect upon the initiated waves. With this object in view a separate reflecting surface is arranged in the auxiliary combustion chamber behind which the residues of the burnt gases are pushed at the compression, or by arranging separate lateral spaces into which the residues of the burnt gases are forced so that the end wall, which acts as reflecting surface, is free to exert its effect.

These two arrangements might be combined.

By convenient selection of the distance between the reflecting surface and the point at which the initial waves are produced it is possible to regulate the velocity of the reflected waves and produce at this point by special increase of pressure a self ignition, eventually in the auxiliary combustion space.

The arrangement according to the invention presents essential advantages in case scavenging air is supplied from the outside into the auxiliary combustion space. This scavenging air will scavenge the residues of the burnt gases either partly or completely according to the position of the point of admission and at the end of the compression will be admixed with residues of burnt gases which may have been left behind and enriched by the mixture coming from the main combustion space. The inflammation would in this case, owing to the fact that the combustibility of the mixture decreases from the ignition point, be retarded, this being just the opposite of what is wanted as the combustion speed must be accelerated.

By arranging the reflecting surface near the ignition point and in front of the residues of the burnt gases it is possible to produce favorable ignition waves.

At the same time the advantage is obtained that the residues of the burnt gases, which are forced back behind the reflecting surface, do not combine with the fresh charge by the formation of eddies whereby the quality of this fresh charge would be impaired.

The arrangement is shown in the accompanying drawings in which:—

Fig. 1 is a vertical sectional view of one form of the invention,

Fig. 2 is a similar view of a slightly modified form of the invention,

Fig. 3 is a further modification of the arrangement according to the invention.

In the form of construction shown in Fig. 1 a secondary space is formed by means of an insertion 4 projecting into an auxiliary combustion space 1 having an ignition point 2, for instance a spark plug 3, the inner end of this insertion 4 forming a reflecting surface 5, and said insertion being arranged in such a manner that an annular space 6 is formed around the same, into which, at the compression stroke, the residues 7 of the burnt gases are forced.

The dimensions of the annular secondary space 6 are selected so that, at the moment when the ignition takes place, the residues of the gases have been forced completely behind the surface 5. The explosion and pressure waves moving in the direction of the arrows 8 are consequently reflected upon the surface 5 and run after the waves which wander in the direction of the arrow 9, the dimensions being selected so that a special increase of pressure is obtained in the combustion space.

Between the ignition point and the orifice of the auxiliary combustion space special insertions 10 may be arranged.

After the explosion has taken place the residues 7 of the burnt gases are partly drawn along from space 6 so that they flow into the main combustion space after the pressure waves which have been produced first.

In the form of construction shown in Fig. 2 an insertion 12 is arranged so that it projects into an auxiliary combustion space 11, the reflecting surface 13 of the insertion 12 being adapted to be adjusted at various distances from the ignition point in order that by varying this distance the most favorable position of this reflecting surface may be found.

In order to vary the dimensions of the adjacent chambers an annular collar 14 may be provided on the support of the insert 12 and this support may be adjusted by being screwed out and in on the wall of the auxiliary combustion chamber.

In the form of construction shown in Fig. 3 the insertion 16 projecting into an auxiliary combustion chamber 15 is constructed to serve as carrier for a valve 17, this valve serving as reflecting surface. A secondary space 18 is also provided into which the residue gases are forced so that they are accumulated behind the face of valve 17. In other words at the time of ignition the reflecting surface is not formed by a rigid portion of such an insert but on the surface of the valve plate which is closed during this period. This valve 17 on the other hand may be used for admitting a charge to the chamber.

When the valve 17 is used for the admission of scavenging air the dimensions may be selected so that a portion of the scavenging air or of the diluted mixture which is formed remains in front of the reflecting surface of valve 17 so that, by the formation of eddies in the mixture flowing from the main combustion chamber into the auxiliary combustion chamber, oxygen is again intimately mixed with this mixture.

The arrangement shown in Fig. 3 may be used also to admit through the insertion 16 not scavenging air but a rich mixture into the auxiliary combustion chamber, while from the main combustion chamber a poor mixture is admitted at the compression. In this case a rich mixture would remain in front of the reflection surface and this would enrich the poor mixture flowing in from the main combustion chamber up to the favorable ignition capability.

A specially practical form of construction can be created by arranging in the space which communicates with the main combustion space a spark plug which has behind the ignition point of the electrodes a reflecting surface, the regulating of the reflecting action being effected by adjusting the distance of the ignition point from the reflection surface in a similar manner as has been described with regard to Figs. 1 and 2. The space around or in the spark plug serves as space for accommodating the burnt gases at the compression.

I claim:—

1. In an internal combustion engine, in combination, a main combustion chamber, an auxiliary combustion chamber freely communicating with the main combustion chamber, ignition means arranged in the auxiliary chamber, and a reflecting surface in the auxiliary chamber at some distance behind the ignition means and adapted to reflect initial ignition waves into the main combustion chamber and providing chambers suitable for the reception of non-ignitible gases during the compression, the reflecting surface and the igniting means being so arranged relative to the spaces for receiving the combustion gases that at the moment of the ignition, the ignition means and the reflecting surface are free of exhaust gases.

2. In a combustion engine, in combination, a main combustion chamber, an auxiliary combustion chamber freely communicating connected with the main combustion chamber, igniting means in the auxiliary combustion chamber, an adjustable inserted member protruding into the auxiliary combustion chamber and having a reflection surface at a certain distance behind the ignition means and adapted to reflect initial ignition waves into the main combustion chamber, and an adjoining chamber around such inserted member for receiving the non-combustible gases during the compression.

3. In an internal combustion engine in combination, a main combustion chamber, an auxiliary combustion chamber connected with the main combustion chamber, ignition means arranged in the auxiliary chamber, an insert projecting into the auxiliary chamber and providing a reflecting surface positioned behind the ignition means, and adjacent chambers about this insert for the reception of non-ignitible gases during the compression.

In testimony whereof I affix my signature.

WILHELM EBERHARD ERNST.